(12) United States Patent
Iwashita et al.

(10) Patent No.: US 8,147,381 B2
(45) Date of Patent: Apr. 3, 2012

(54) CLUTCH CONTROL SYSTEM FOR SADDLE RIDING TYPE VEHICLE

(75) Inventors: Kanau Iwashita, Saitama (JP); Akihiko Tomoda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 798 days.

(21) Appl. No.: 12/238,231

(22) Filed: Sep. 25, 2008

(65) Prior Publication Data

US 2009/0088298 A1    Apr. 2, 2009

(30) Foreign Application Priority Data

Sep. 27, 2007    (JP) ................. 2007-251325

(51) Int. Cl.
*B60W 10/02* (2006.01)
*B60W 10/04* (2006.01)
*G06F 7/00* (2006.01)
*G06F 17/00* (2006.01)
*G06F 19/00* (2011.01)

(52) U.S. Cl. ........ 477/175; 477/176; 477/180; 477/181; 701/67; 701/70

(58) Field of Classification Search .................. 477/175, 477/176, 180, 181; 701/67, 68, 70–72
See application file for complete search history.

(56) References Cited

U.S. PATENT DOCUMENTS

| 4,796,718 | A | * | 1/1989 | Thielen et al. ................. 180/197 |
| 4,984,161 | A | * | 1/1991 | Nakazawa et al. .............. 701/55 |
| 5,020,622 | A | * | 6/1991 | Hrovat ........................... 180/197 |
| 5,676,219 | A | * | 10/1997 | Fruhwirth et al. ............. 180/197 |
| 6,029,511 | A | * | 2/2000 | Welsch et al. ............... 73/115.08 |
| 2007/0191186 | A1 | | 8/2007 | Bothe et al. |
| 2008/0167784 | A1 | * | 7/2008 | Fujita et al. ..................... 701/71 |
| 2008/0269994 | A1 | * | 10/2008 | Karlsson et al. ................ 701/48 |
| 2010/0305802 | A1 | * | 12/2010 | Seufert et al. ................... 701/29 |

FOREIGN PATENT DOCUMENTS

| DE | 102005035882 A1 | 2/2006 |
| DE | 10 2005 003 981 A1 | 8/2006 |
| DE | 10 2005 012 775 A1 | 10/2006 |
| EP | 1531279 A1 | 5/2005 |
| JP | 59202963 A * | 11/1984 |
| JP | 2003-294062 A | 10/2003 |
| WO | WO-03/016085 A1 | 2/2003 |

* cited by examiner

*Primary Examiner* — Tisha Lewis
(74) *Attorney, Agent, or Firm* — Birch, Stewart, Kolasch & Birch, LLP (57) ABSTRACT

A grip force of a driving wheel is maintained by identifying an actual condition of a motorcycle and controlling a clutch in a timely manner. A clutch control system includes a clutch, an actuator unit causing the clutch to engage or disengage, a rear wheel speed sensor, a front wheel speed sensor, a clutch lever sensor and a controller controlling a control motor based on a rear wheel speed and a front wheel speed. When the rear wheel speed is lower than the front wheel speed and an absolute value of a difference between the rear wheel speed and the front wheel speed is greater than a threshold value, the control motor is driven so as to reduce a transmission force of the clutch. When an operational amount of the clutch lever is greater than a threshold value, processing to reduce the transmission force of the clutch is suspended.

20 Claims, 7 Drawing Sheets

CLUTCH CONTROL SYSTEM FOR SADDLE RIDING TYPE VEHICLE

CROSS-REFERENCE TO RELATED APPLICATIONS

The present application claims priority under 35 USC 119 to Japanese Patent Application No. 2007-251325 filed on Sep. 27, 2007 the entire contents of which are hereby incorporated by reference.

FIELD OF THE INVENTION

The present invention relates to a clutch control system for a saddle riding type vehicle, the system including a clutch connecting and disconnecting a driving force from an engine relative to a driving wheel, an actuator causing the clutch to engage or disengage, and an actuator control means controlling the actuator.

DESCRIPTION OF BACKGROUND ART

In general with regard to motorcycles an output from an engine is transmitted to a driving wheel via a clutch. An engine brake is applied when sudden downshifting is carried out or on a similar occasion, resulting in a decrease in a grip force from a road surface. The driving wheel may at times run idle due to a reduced tire grip force. To respond to such situations occurring as a result of the engine brake being applied, a control has been proposed for engaging and disengaging the clutch or for providing a back torque limiter. See, for example, Japanese Patent Laid-open No. 2003-294062.

Japanese Patent Laid-open No. 2003-294062 controls the clutch by estimating an engine brake operating condition based on a parameter indicating a vehicle operating condition. The vehicle operating condition can, however, be varied by application of the brake only to the driving wheel or changes in road surface conditions, other than the engine brake. As a result, the means of estimation using the parameter indicating the vehicle operating condition may not be able to identify correctly the tire grip condition.

SUMMARY AND OBJECTS OF THE INVENTION

The present invention has been made to solve the foregoing problems and it is an object of an embodiment of the present invention to provide a clutch control system for a saddle riding type vehicle capable of maintaining a good grip force of the driving wheel by identifying actual conditions of the vehicle without relying on any estimation means.

A clutch control system for a saddle riding type vehicle according to the present invention has the following aspects.

According to an embodiment of the present invention, the clutch control system includes a clutch, an actuator, a driving wheel speed detection means, a driven wheel speed detection means, and an actuator control means. More specifically, the clutch connects and disconnects a driving force from an engine relative to a driving wheel. The actuator causes the clutch to engage or disengage. The driving wheel speed detection means detects a driving wheel peripheral speed in the driving wheel. The driven wheel speed detection means detects a driven wheel peripheral speed in a driven wheel. The actuator control means controls the actuator based on the driving wheel peripheral speed obtained from the driving wheel speed detection means and the driven wheel peripheral speed obtained from the driven wheel speed detection means.

Further, the actuator control means reduces a transmission force of the clutch when the driving wheel peripheral speed is lower than the driven wheel peripheral speed and an absolute value of a difference between the driving wheel peripheral speed and the driven wheel peripheral speed is greater than a first threshold value.

As such, the decision made based on the driving wheel peripheral speed and the driven wheel peripheral speed allows an actual condition of the saddle riding type vehicle to be identified. This enables clutch control with appropriate in a timely manner, so that a grip force of the driving wheel can be appropriately maintained.

According to an embodiment of the present invention, the clutch control system further includes an engine control means. The engine control means reduces an output of the engine when the driving wheel peripheral speed is higher than the driven wheel peripheral speed and an absolute value of a difference between the driving wheel peripheral speed and the driven wheel peripheral speed is greater than a second threshold value.

As such, if the driving wheel peripheral speed is greater than the driven wheel peripheral speed by a predetermined degree or more, it can be determined that a driving force of the driving wheel is not sufficiently transmitted to a road surface (e.g., the driving wheel runs idle). The output of the engine is then reduced so as to recover the grip force of the driving wheel.

According to an embodiment aspect of the present invention, the clutch control system further includes a clutch lever and a lever operation amount detection means. The clutch lever manually causes the clutch to engage and disengage. The lever operation amount detection means detects an operation amount of the clutch lever. The actuator control means suspends or does not start processing for reducing the transmission force of the clutch when the operation amount obtained from the lever operation amount detection means is greater than a third threshold value.

As such, if the operation amount of the clutch lever is large, a rider apparently attempts to disengage the clutch of his or her own will. Control is thus performed giving preference to the will of the rider.

According to an embodiment of the present invention, the clutch control system further includes an inclination angle detection means. The inclination angle detection means detects an inclination angle of the saddle riding type vehicle to the left or right. The actuator control means controls the transmission force of the clutch based on the inclination angle obtained from the inclination angle detection means.

As such, when the inclination angle of the saddle riding type vehicle is fairly large, it can be determined that the vehicle is turning. Then, appropriate clutch control according to the turning is provided and the grip force of the driving wheel can be maintained appropriately.

According to an embodiment of the present invention, the clutch control system further includes an inclination angle detection means. The inclination angle detection means detects an inclination angle of the saddle riding type vehicle to the left or right. The engine control means controls the output of the engine based on the inclination angle obtained from the inclination angle detection means.

As such, when the inclination angle of the saddle riding type vehicle is fairly large, it can be determined that the vehicle is turning. Then, the output of the engine is controlled appropriately according to the turning and the grip force of the driving wheel can be maintained even more appropriately.

In the clutch control system for the saddle riding type vehicle according to the embodiments of the present invention, the decision made based on the driving wheel peripheral speed and the driven wheel peripheral speed identifies the actual condition of the saddle riding type vehicle and controls the clutch in a timely manner to maintain the grip force of the driving wheel appropriately.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

A clutch control system for a saddle riding type vehicle according to a specific embodiment to which the present invention is applied will be described below with reference to the accompanying FIGS. 1 through 7. A clutch control system 10 according to the embodiment of the present invention is mounted on a motorcycle 11. The motorcycle 11 will first be described below.

Figure 1:
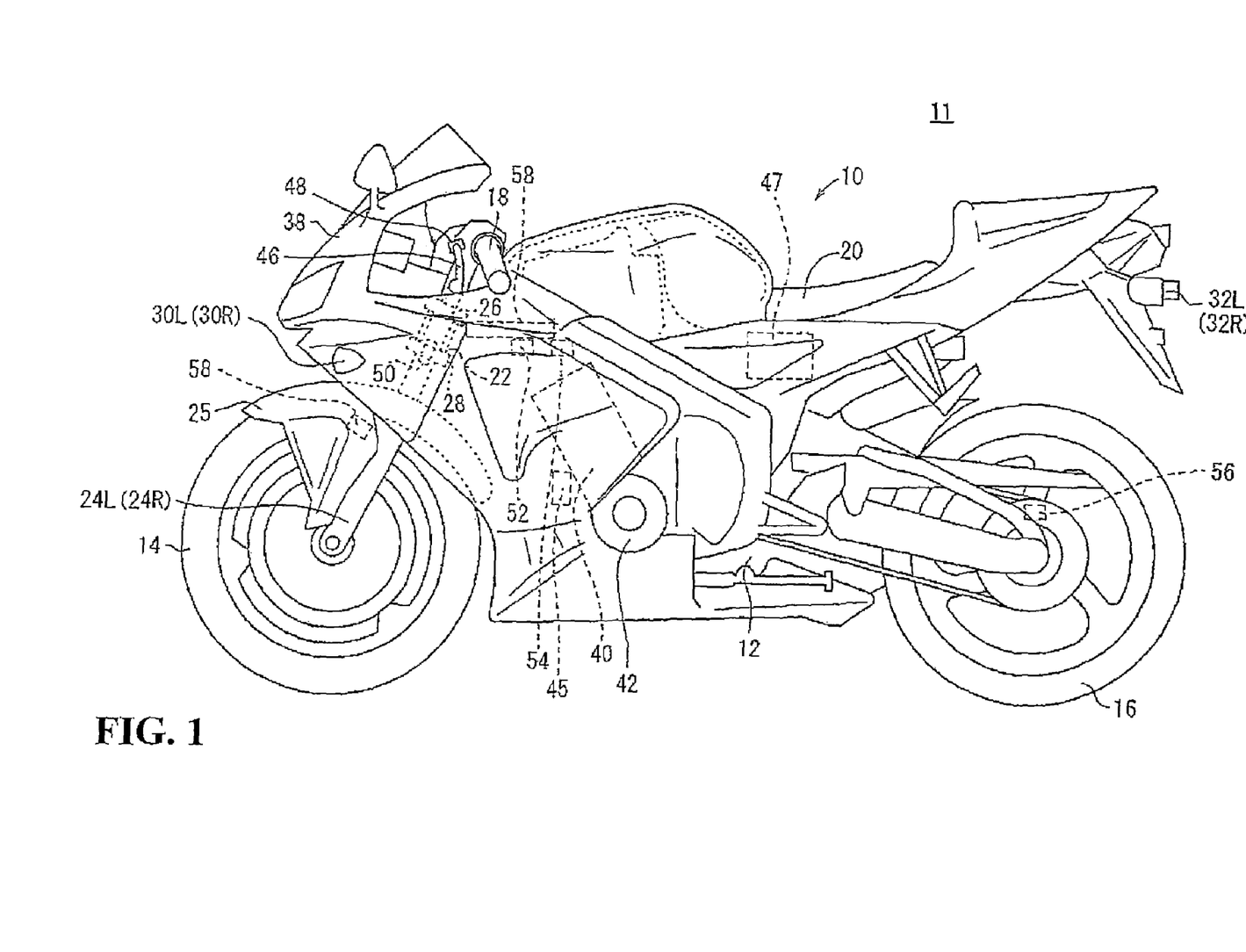
FIG. 1 is a side elevational view showing a motorcycle, on which a clutch control system according to an embodiment of the present invention is mounted.

The embodiment of the present invention will be illustrated as being applied to a full cowling type motorcycle 11 (saddle riding type vehicle) as shown in FIG. 1. The embodiment is nonetheless only illustrative and is applicable to a saddle riding type vehicle of a different type (for example, a scooter, a buggy, or the like). In the motorcycle 11, a pair of left and right mechanisms or elements symmetrically disposed on a body of the motorcycle 11 will be identified by reference numerals appended with "L" for the left one and "R" for the right one. In the descriptions that follow, "right" refers to the right-hand side of the vehicle body as viewed from a rider of the motorcycle 11 and "left" refers to the left-hand side of the vehicle body as viewed from the rider.

Referring to FIG. 1, the motorcycle 11 includes a vehicle body frame 12, a front wheel 14, a rear wheel 16, a handlebar 18, and a seat 20. More specifically, the vehicle body frame 12 is a cradle type constituting a vehicle body. The front wheel 14 is a steered wheel and a driven wheel. The rear wheel 16 is a driving wheel. The handlebar 18 steers the front wheel 14. The seat 20 is where a rider is seated.

Referring to FIG. 1, a top bridge 26 is connected to the handlebar 18 at the front of the vehicle body. Front forks 24L, 24R are connected to left and right ends of the top bridge 26. The front forks 24L, 24R penetrate through a bottom bridge 28 to journal the front wheel 14 rotatably.

The rider sitting in the seat 20 turns the handlebar 18 to the left or right to rotate the handlebar 18, the top bridge 26, the front forks 24L, 24R, the bottom bridge 28, and the front wheel 14 integrally to the left or right around a head pipe 22.

A front fender 25 covering the front wheel 14 from an upward direction is mounted on the front forks 24L, 24R.

Winkers 30L, 30R are disposed at a forward side of a cowl 38 in the motorcycle 11 and winkers 32L, 32R are disposed at a rear portion side of the motorcycle 11.

The rear wheel 16 is driven via a transmission 42 from an engine 40. A clutch 44 (see FIG. 5), which connects or disconnects a driving force from the engine 40 relative to the rear wheel 16, is disposed in juxtaposition with the transmission 42. An actuator unit 45 automatically causing the clutch 44 to engage or disengage is disposed near the clutch 44. A controller 47 performing electric control of the motorcycle 11 is disposed downwardly of the seat 20.

The left hand side of the handlebar 18 includes a clutch lever 46 and a clutch lever sensor (lever operation amount detection means) 48 disposed thereon. The clutch lever 46 manually engages or disengages the clutch 44. The clutch lever sensor 48 detects an operation amount C of the clutch lever 46. The clutch lever sensor 48 may be a switch (lever operation amount detection means) like a brake switch disposed on a brake lever for lighting up a brake lamp.

A steering angle sensor (steering angle detection means) 50 is disposed at a center of the bottom bridge 28. The steering angle sensor 50 detects a steering angle $\theta$ of the handlebar 18 of the motorcycle 11. An inclination angle sensor (inclination angle detection means) 52 and an acceleration sensor 54 are disposed inside the cowl 38. The inclination angle sensor 52 detects an inclination angle $\Phi$ of the motorcycle 11 to the left or right (specifically, a bank angle). The acceleration sensor 54 detects an acceleration G in a longitudinal direction of the motorcycle 11.

A rear wheel speed sensor (driving wheel speed detection means) 56 is disposed near the rear wheel 16. The rear wheel speed sensor 56 detects a rear wheel speed Pr. In addition, a front wheel speed sensor (driven wheel speed detection means) 58 detecting a front wheel speed Pf is disposed near the front wheel 14. The rear wheel speed sensor 56 and the front wheel speed sensor 58 are also used in an ABS (anti-lock brake system) not shown. The rear wheel speed Pr and the front wheel speed Pf are actually used by being multiplied by a constant in the controller 47 such that each represents a peripheral speed (a speed of the wheel in contact with a road surface) of the rear wheel 16 and the front wheel 14, respectively (driving wheel speed detection means, driven wheel speed detection means). For convenience sake, however, the peripheral speeds are simply referred to as the rear wheel speed Pr and the front wheel speed Pf.

Figure 2:
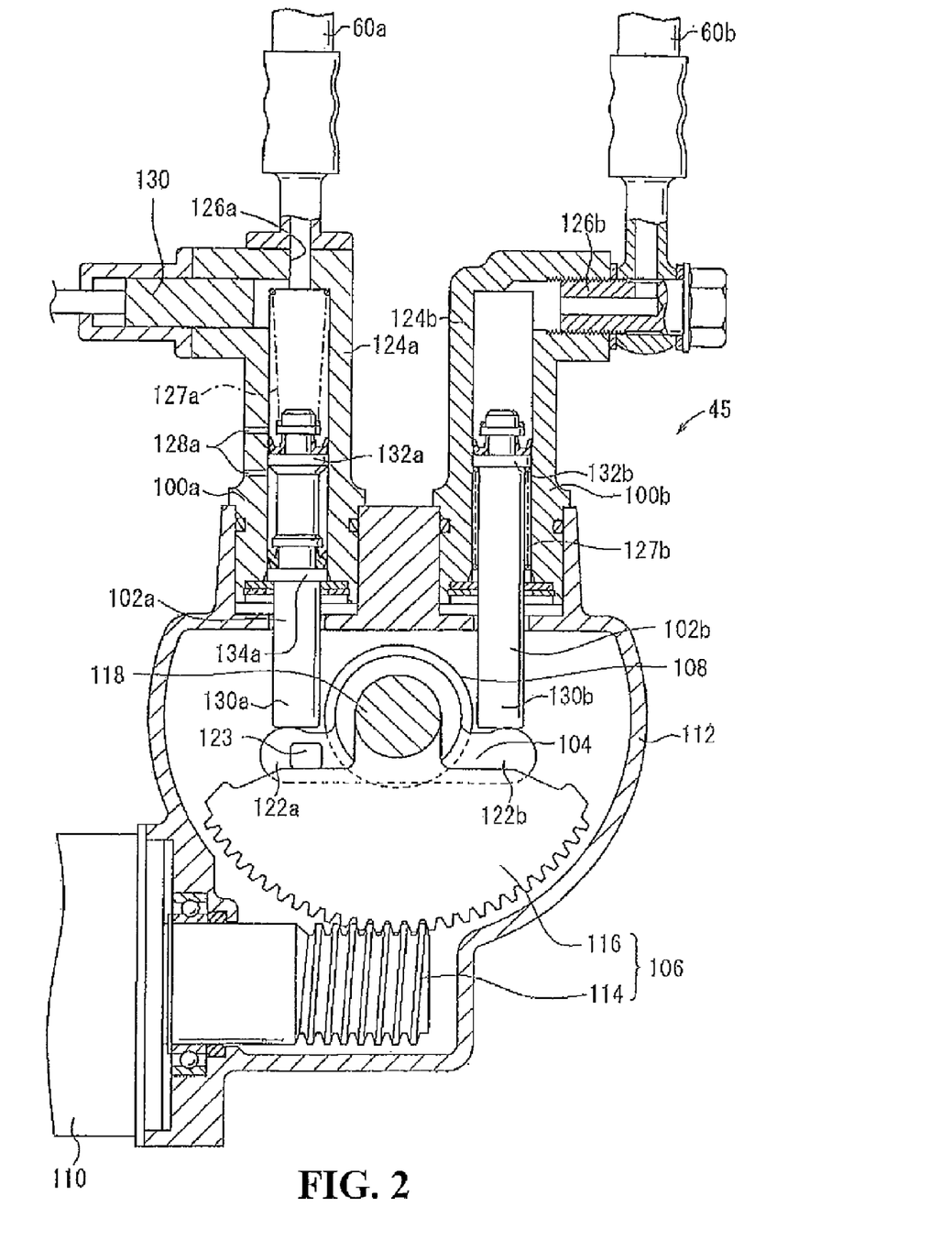
FIG. 2 is a cross-sectional, side elevational view showing an actuator unit in a reference state.

Referring to FIG. 2, the actuator unit 45 includes a first master cylinder 100a, a second slave cylinder 100b, a cam body 104, a gear mechanism 106, a potentiometer 108, and a control motor (actuator) 110. More specifically, the first master cylinder 100a is connected to a first duct 60a. The second slave cylinder 100b is connected to a second duct 60b. The cam body 104 presses to drive lower ends of a first master piston 102a of the first master cylinder 100a and a second slave piston 102b. The gear mechanism 106 tiltably drives the cam body 104. The potentiometer 108 detects a tilted angle of the cam body 104. The control motor 110 rotatably drives the gear mechanism 106.

The gear mechanism 106 is housed in a case 112. The first master cylinder 100a and the second slave cylinder 100b protrude upwardly from the case 112, being disposed injuxtaposition with each other. The control motor 110 protrudes sideways from a lower portion of the case 112. The potentiometer 108 and the control motor 110 are connected to the controller 47.

The gear mechanism 106 includes a worm gear 114, a sector wheel gear 116, and a gear shaft 118. The worm gear 114 is integrally formed with a rotation shaft of the control motor 110. The wheel gear 116 meshes with the worm gear 114. The gear shaft 118 serves as a rotation shaft of the wheel gear 116.

The cam body 104 is a symmetrically shaped cam rotatably journaled on the gear shaft 118. The cam body 104 includes a first cam 122a and a second cam 122b. The first cam 122a is disposed at a leading end of an arm extending along a first end (on the side of the first cam 122a) of the gear shaft 118. The second cam 122b is disposed at a leading end of an arm extending along a second end of the gear shaft 118. The first cam 122a and the second cam 122b may be a roller body. The arm extending along the first end of the cam body 104 includes a protrusion 123 disposed on a side surface thereof.

The wheel gear 116 meshes with teeth on an upper surface side of the worm gear 114 to make a tiltable rotation in a perpendicular plane. Rotating in a clockwise direction in FIG. 2, the wheel gear 116 brings an end thereof into abutment on the protrusion 123 of the cam body 104, thus rotating the cam body 104 in the clockwise direction.

The first master cylinder 100a includes the first master piston 102a, a cylinder tube 124a, a first port 126a, a spring 127a, and two hydraulic oil replenishment ports 128a. The first master piston 102a advances into, and retracts from, the cylinder tube 124a. The first port 126a is disposed at an upper leading end of the first master cylinder 100a. The spring 127a is disposed inside the cylinder tube 124a. The hydraulic oil replenishment ports 128a are connected to a reservoir tank 129 (see FIG. 9).

The first master piston 102a includes a rod 130a, an upper primary flange 132a, and a lower secondary flange 134a. More specifically, the rod 130a protrudes into the case 112 to be in contact with, or spaced away from, the first cam 122a. The primary flange 132a and the secondary flange 134a slide along an inner peripheral surface of the cylinder tube 124a. The first master piston 102a is pushed up by the first cam 122a to displace the hydraulic oil in the first duct 60a. A pressure sensor 130 is connected sideways relative to the cylinder tube 124a.

The two hydraulic oil replenishment ports 128a are disposed at vertical positions near the primary flange 132a in a reference position (at a bottom dead center position) in a side surface of the cylinder tube 124a. The hydraulic oil replenishment ports 128a are connected to the reservoir tank 129. This arrangement allows the hydraulic oil to be supplied from the reservoir tank 129 or recovered as necessary to cope with changing amounts of hydraulic oil supplied in accordance with changes in the volume of the hydraulic oil caused by changes in temperature or the like. When the first master piston 102a goes up slightly, the hydraulic oil replenishment ports 128a are plugged by a primary cup 136a. This leaves the first duct 60a and the reservoir tank 129 out of fluid communication from each other. Thereafter, the hydraulic oil is pressurized and displaced into the first duct 60a.

In the second slave cylinder 100b, like elements in the first master cylinder 100a will have common reference numerals with a suffix of b. The second slave cylinder 100b is a 90° elbow having a second port 126b connected to the second duct 60b.

The second slave piston 102b has no portion that corresponds to the secondary flange 134a in the first master piston 102a. The second slave piston 102b can advance downwardly to push down the second cam 122b. A primary flange 132b has a bottom surface supported by a spring 127b. The second slave piston 102b maintains an adequate height in an initial state thereof.

Figure 3:
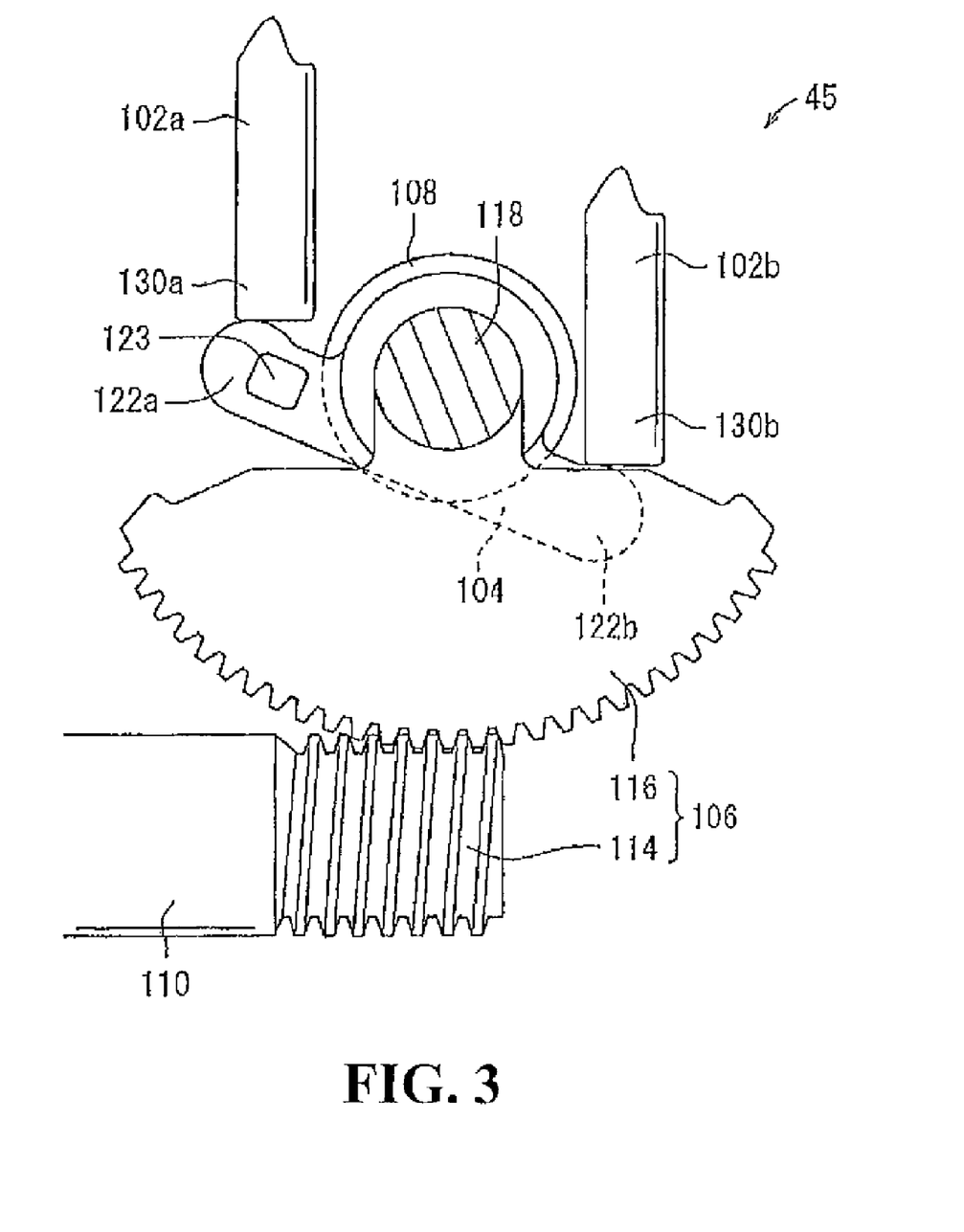
FIG. 3 is a cross-sectional, side elevational view showing the actuator unit when a rider operates a clutch lever.

Referring to FIG. 3, in the actuator unit 45 having the arrangements as described above, when the second slave piston 102b presses down the second cam 122b as a result of pressure having been generated in the second duct 60b, the cam body 104 is rotated clockwise, so that the hydraulic oil can be supplied to the first duct 60a. At this time, the worm wheel 116 is spaced apart from the protrusion 123 of the cam body 104.

Figure 4:
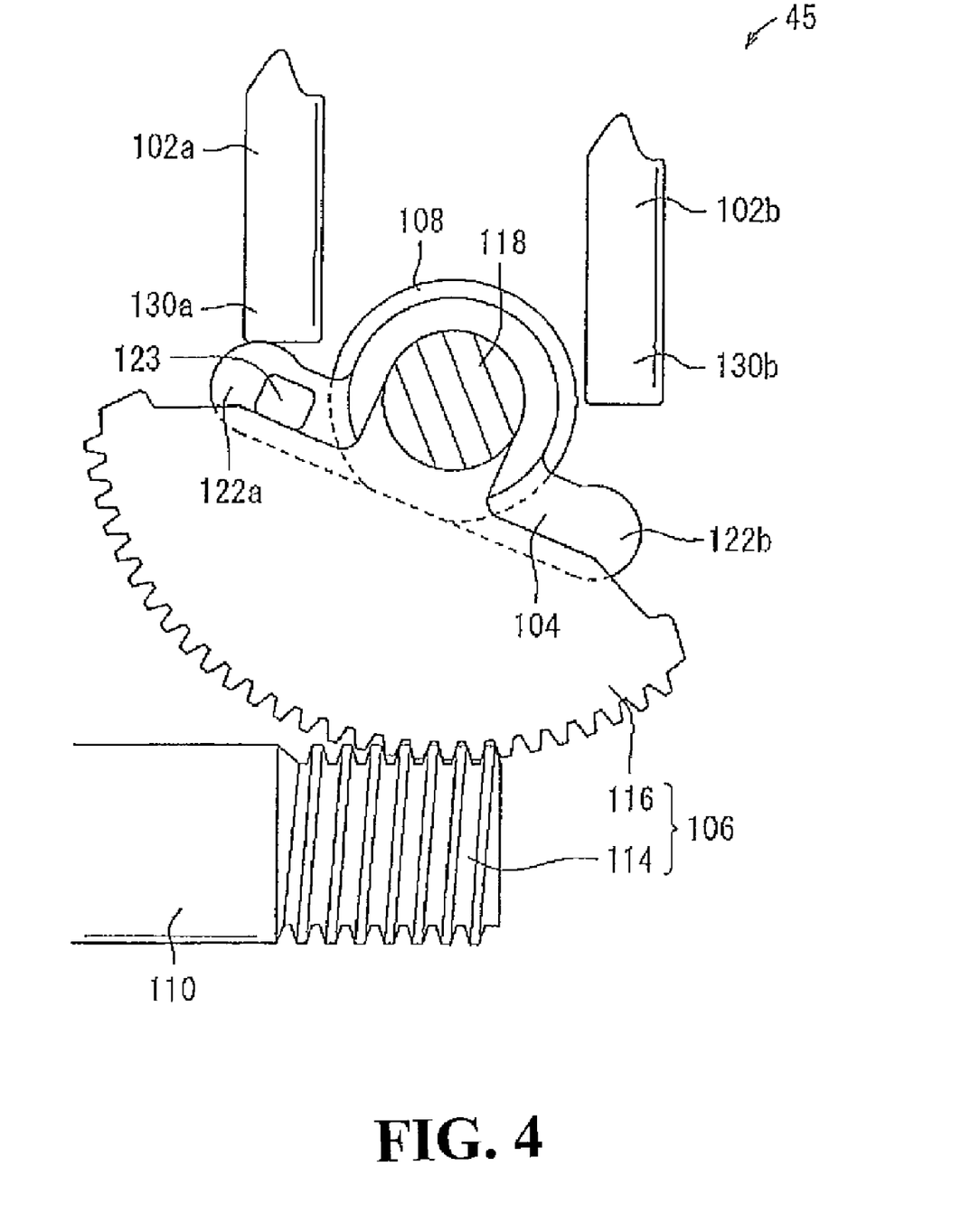
FIG. 4 is a cross-sectional, side elevational view showing the actuator unit when a control motor is automatically driven.

Referring to FIG. 4, clockwise rotation of the wheel gear 116 under an action of the control motor 110 and the worm gear 114 causes the end of the wheel gear 116 to abut on the protrusion 123 of the cam body 104, so that the cam body 104 rotates clockwise. In this case, too, the hydraulic oil can be supplied to the first duct 60a. At this time, the second cam 122b lowers to be spaced away from the second slave piston 102b.

More specifically, in the actuator unit 45 according to the embodiment of the present invention, the first duct 60a can be supplied with the hydraulic oil by supplying the hydraulic oil from the second duct 60b or rotating the control motor 110.

Figure 5:
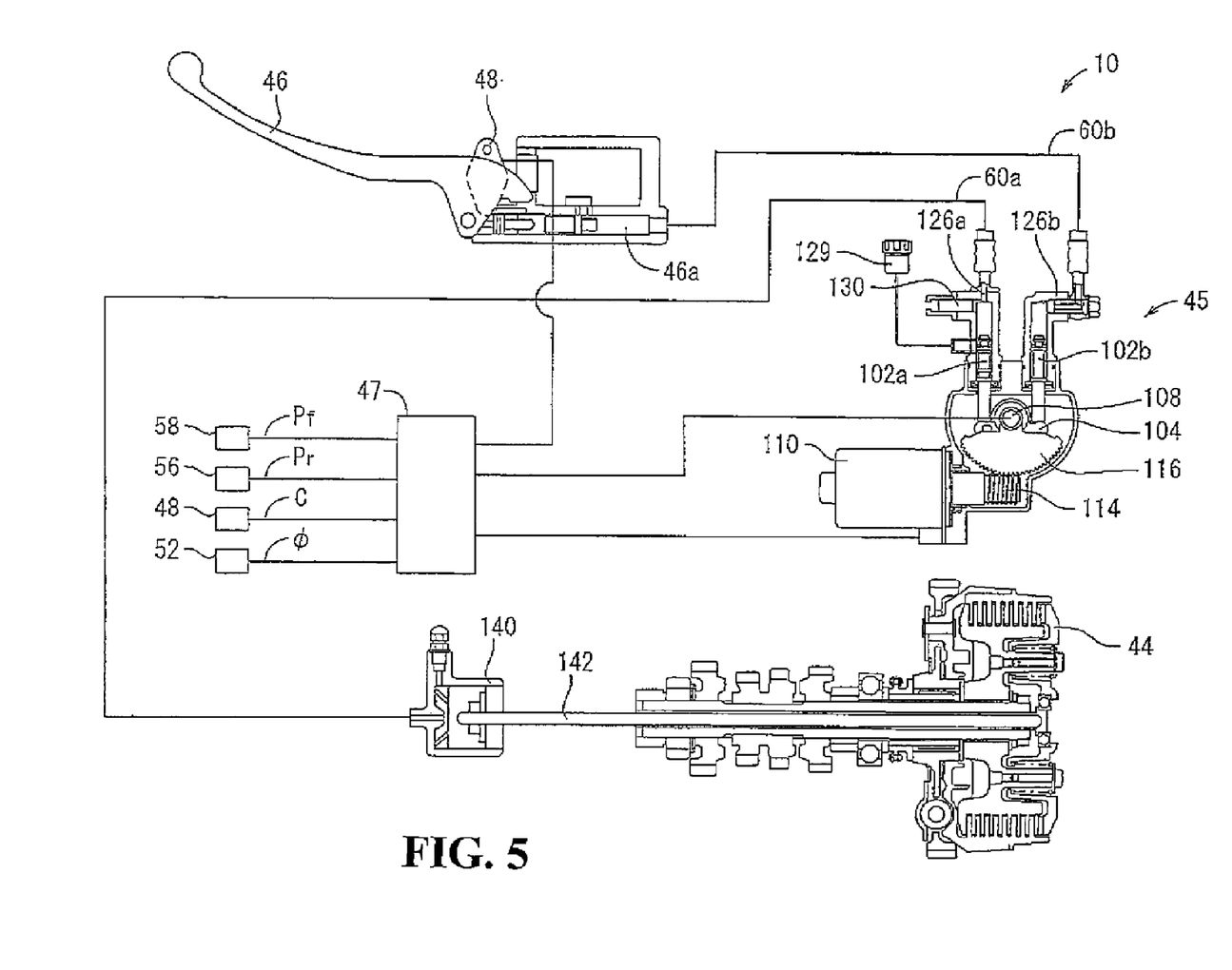
FIG. 5 is a mechanical block diagram of the clutch control system according to the embodiment of the present invention.
Figure 6:
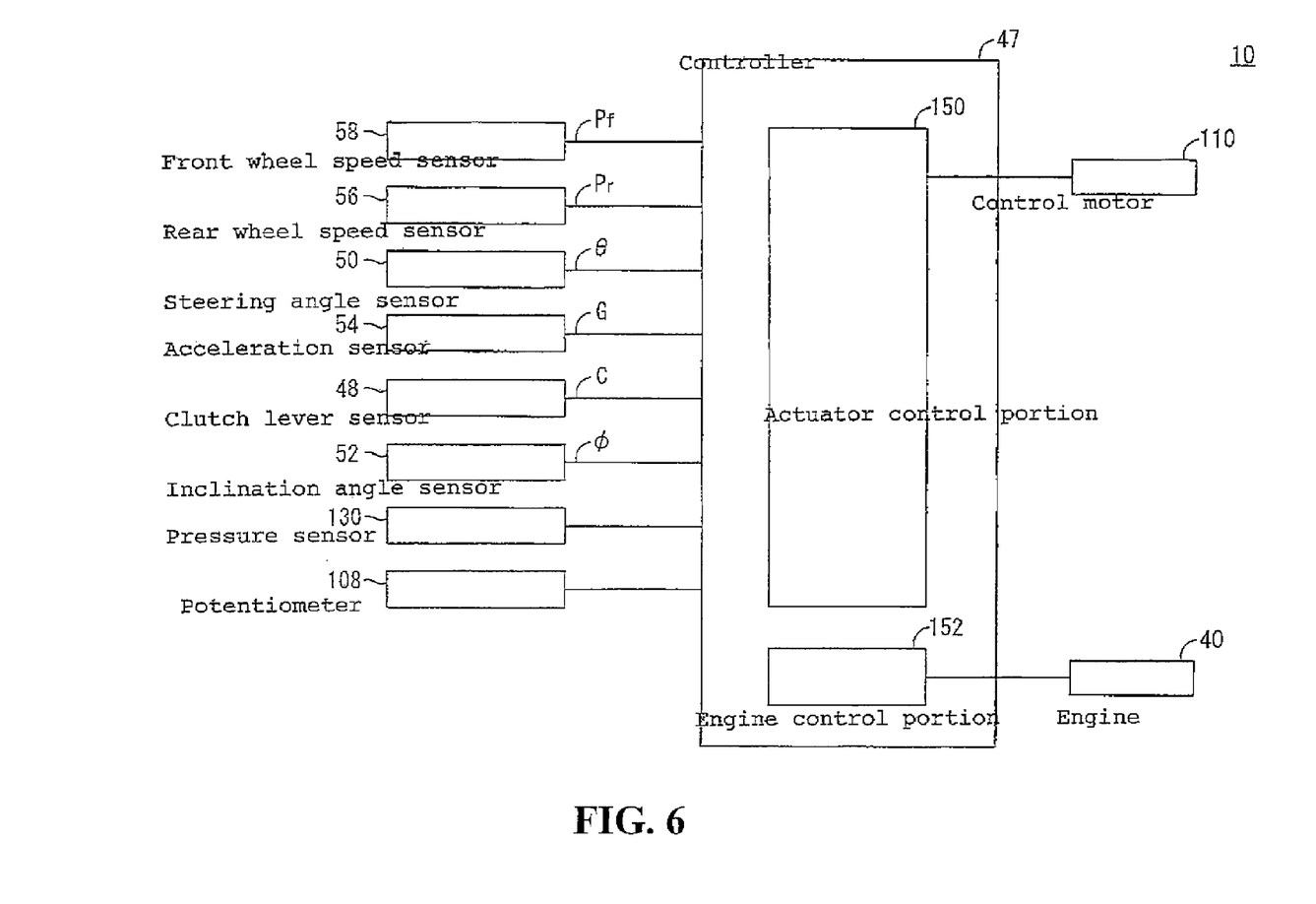
FIG. 6 is an electrical block diagram of the clutch control system according to the embodiment of the present invention.

Referring to FIGS. 5 and 6, the clutch control system 10 includes the clutch 44, the actuator unit 45, the clutch lever 46, and the controller 47.

Referring to FIG. 5, the first duct 60a having communication with the first port 126a of the actuator unit 45 is connected to a first slave cylinder 140. The second duct 60b having communication with the second port 126b of the actuator unit 45 is connected to a cylinder chamber (second master cylinder) 46a of the clutch lever 46. The first slave cylinder 140, being supplied with the hydraulic oil from the first duct 60a, is capable of performing engagement and disengagement operations of the clutch 44 via a push rod 142. More specifically, the first slave cylinder 140 advances the push rod 142 to disengage the clutch 44 and retracts the push rod 142 to engage the clutch 44. The controller 47 drives the control motor 110 by referring to a signal from the potentiometer 108.

The foregoing arrangements permit the following. More specifically, when the rider pulls the clutch lever 46, the hydraulic oil is displaced through the second duct 60b, which rotates the cam body 104 via the second slave piston 102b. This displaces the hydraulic oil into the first duct 60a, so that the clutch 44 can be disengaged. Under the action of the controller 47, on the other hand, the control motor 110 and the worm gear 114 are rotated to rotate the cam body 104, so that the hydraulic oil is displaced into the first duct 60a and the clutch 44 is disengaged.

Referring to FIG. 6, the controller 47 is connected to the clutch lever sensor 48, the steering angle sensor 50, the inclination angle sensor 52, the acceleration sensor 54, the front wheel speed sensor 58, the rear wheel speed sensor 56, the potentiometer 108, and the pressure sensor 130, so that the controller 47 can receive detection signals from the foregoing elements. The controller 47 includes an actuator control portion 150 and an engine control portion 152. The actuator control portion 150 controls the control motor 110 based on the signal obtained from each of the foregoing sensors. The engine control portion 152 controls an output of the engine 40 based on the signal obtained from each of the foregoing sensors. In controlling the output of the engine 40, the engine control portion 152 adjusts ignition timing, a fuel injection amount, fuel injection timing, and the like, while taking into consideration signals indicating a throttle opening, an engine speed, a throttle duct vacuum, and the like.

Operations of the clutch control system 10 of the motorcycle 11 having the arrangements as described heretofore will be described with reference to FIG. 7. The operations shown in FIG. 7 are realized by the controller 47 when a computer therein reads and executes a program, repeatedly executed at every brief period of time.

Figure 7:
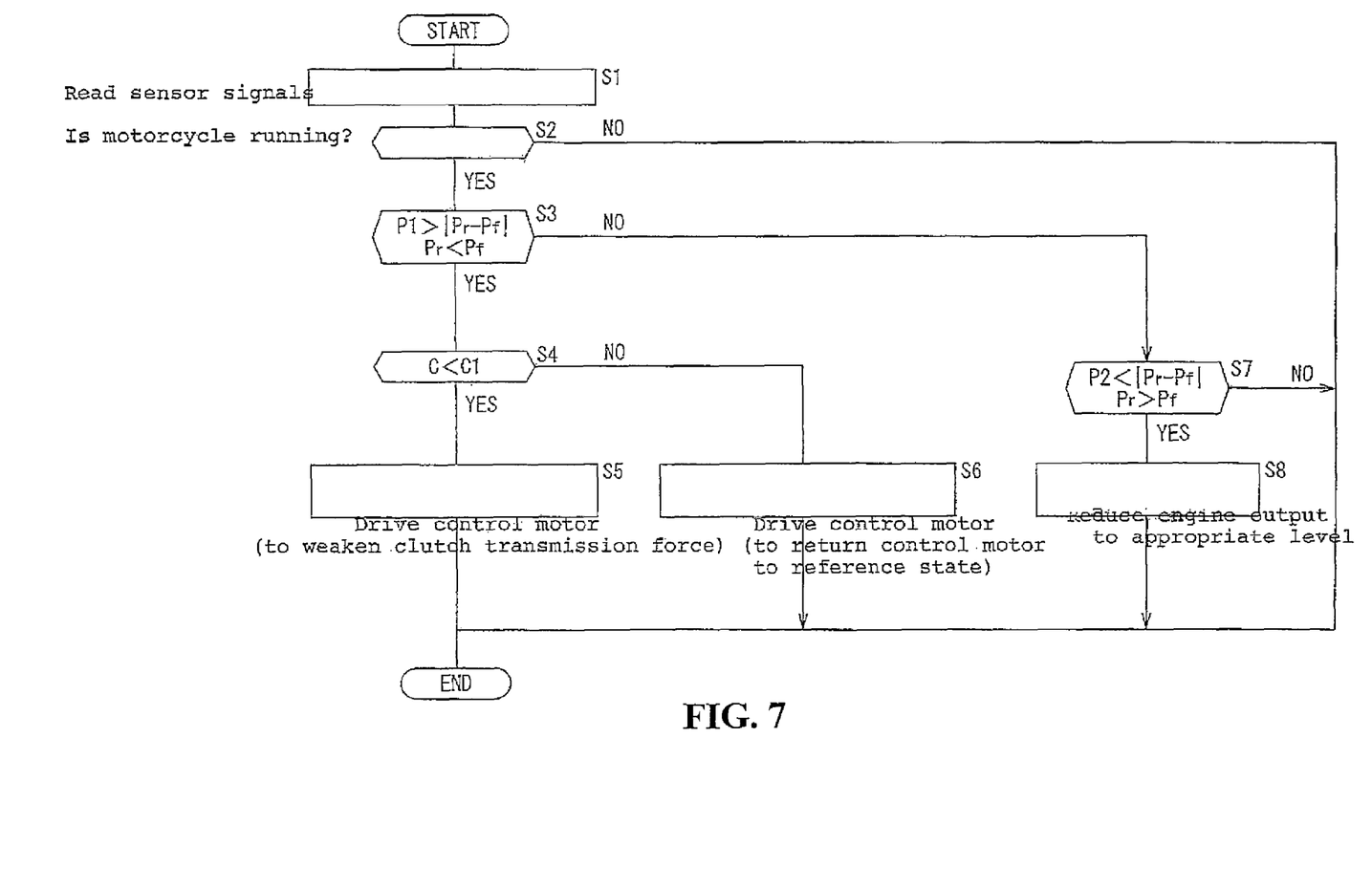
FIG. 7 is a flowchart showing operations performed by the clutch control system according to the embodiment of the present invention.

In step S1 of FIG. 7, signals are read from the sensors.

In step S2, it is determined whether the motorcycle 11 is in a running state or not. If it is determined that the motorcycle 11 is in the running state, the operation proceeds to step S3. If it is determined that the motorcycle 11 is in a stationary state, the current operation shown in FIG. 7 is terminated. It may be determined whether the motorcycle 11 is in the running state or not based on the front wheel speed Pf and the rear wheel speed Pr.

In step S3, it is determined whether the following conditions are met; more specifically, that the rear wheel speed Pr is lower than the front wheel speed Pf (the rear wheel speed Pr is smaller than the front wheel speed Pf) and that an absolute value of a difference between the rear wheel speed Pr and the front wheel speed Pf is greater than a threshold value (a first threshold value) P1. More specifically, it is determined whether the inequality of Pr<Pf and P1>|Pr−Pf| holds true or not. If the inequality is true, the operation proceeds to step S4. If the inequality is not true, the operation proceeds to step S7.

In step S4, the operation amount C of the clutch 44 obtained from the clutch lever sensor 48 and a threshold value (a third threshold value) C1 are referred to. If C<C1, then the operation proceeds to step S5. If C≧C1, then the operation proceeds to step S6.

In step S5, the control motor 110 is driven to displace an adequate amount of hydraulic oil into the first duct 60a. A transmission force of the clutch 44 is thereby weakened to make the clutch 44 partially engaged or disengaged, so that a driving force transmitted from the clutch 44 to the rear wheel 16 is reduced. At this time, the pressure sensor 130 monitors pressure in the first duct 60a.

As such, the decision made based on the rear wheel speed Pr and the front wheel speed Pf allows the actual condition of the motorcycle 11 to be identified, not through estimation processing. This enables clutch control in a timely manner, so that the grip force of the rear wheel 16 can be appropriately maintained.

In step S5, the transmission force of the clutch 44 may, instead, be controlled based on the inclination angle Φ obtained from the inclination angle sensor 52 (e.g., a degree of partial clutch engagement is adjusted). If the inclination angle Φ of the motorcycle 11 is fairly large, it can be determined that the motorcycle 11 is turning. Then, the clutch 44 is controlled appropriately according to the turning and the grip force of the rear wheel 16 can be maintained even more appropriately.

Control of the transmission force of the clutch 44 based on the inclination angle Φ obtained from the inclination angle sensor 52 may not have to be performed with timing of step S5 (when P1>Pr−Pf and C<C1 are true). The control may, instead, be performed under a predetermined condition (e.g., a condition based on the acceleration G).

In step S6, the control motor 110 is driven to bring the wheel gear 116 back to the reference position (the condition shown in FIG. 2), thereby terminating the operation of reducing the transmission force of the clutch 44 (specifically, the operation of step S5). If the operation of reducing the transmission force of the clutch 44 is yet to be performed, the operation is not to be started as long as the condition of step S4 is not met even with the condition of step S3 met thereafter.

As such, if the operation amount C of the clutch lever 46 is large, the rider apparently attempts to disengage the clutch 44 of his or her own will. Control is thus performed giving preference to the will of the rider.

The operations of steps S4 and S6 may be omitted depending on design requirements involved and the operation of step S5 may be executed when the conditions of step S3 are met.

In step S7, it is determined whether the following conditions are met; specifically, that the rear wheel speed Pr is higher than the front wheel speed Pf (the rear wheel speed Pr is greater than the front wheel speed Pf) and that the absolute value of the difference between the rear wheel speed Pr and the front wheel speed Pf is greater than a threshold value (a second threshold value) P2. More specifically, it is determined whether the inequality of Pr>Pf and P2<|Pr−Pf| holds true or not. If the inequality is true, the operation proceeds to step S8. If the inequality is not true, the current operation shown in FIG. 7 is terminated.

In step S8, the engine control portion 152 reduces the output of the engine 40 down to an appropriate amount.

As described above, if the rear wheel speed Pr is greater than the front wheel speed Pf by a predetermined degree or more, it can be determined that the driving force of the rear wheel 16 is not sufficiently transmitted to the road surface (e.g., the rear wheel 16 runs idle). The output of the engine 40 is then reduced so as to recover the grip force of the rear wheel 16.

Alternatively, in step 8, the degree of reduction in the output of the engine 40 may be adjusted based on the inclination angle Φ obtained from the inclination angle sensor 52. As such, when the inclination angle Φ of the motorcycle 11 is fairly large, it can be determined that the motorcycle 11 is turning. Then, the output of the engine 40 is controlled appropriately according to the turning and the grip force of the rear wheel 16 can be maintained even more appropriately.

Control to adjust the degree of reduction in the output of the engine 40 based on the inclination angle Φ obtained from the inclination angle sensor 52 may not have to be performed with timing of step S8 (when P2<Pr−Pf is true). The control may, instead, be performed under a predetermined condition (e.g., a condition based on the acceleration G).

The inclination angle Φ may not have to be obtained from the inclination angle sensor 52. Rather, the clutch control system 10 may include a lateral direction acceleration sensor, or the inclination angle Φ may be obtained through calculation using the running speed, the steering angle θ, and the like (inclination angle detection means).

After steps S5, S6, and S8, the current operation shown in FIG. 7 is terminated.

As described heretofore, in the clutch control system 10 of the motorcycle 11 according to the embodiment of the present invention, the decision made based on the rear wheel speed Pr and the front wheel speed Pf identifies the actual condition of the motorcycle 11 and controls the clutch 44 in a timely manner to maintain the grip force of the rear wheel 16 appropriately.

It should be understood that the clutch control system of the saddle riding type vehicle according to the present invention is not limited to the disclosed embodiment, but also encompasses those changes falling within the spirit and scope of the appended claims.

What is claimed is:

1. A clutch control system for a saddle riding vehicle, comprising:
    a clutch connecting and disconnecting a driving force from an engine relative to a driving wheel;
    an actuator causing the clutch to engage or disengage;
    a driving wheel speed detection means detecting a driving wheel peripheral speed in the driving wheel;
    a driven wheel speed detection means detecting a driven wheel peripheral speed in a driven wheel; and
    an actuator control means controlling the actuator based on the driving wheel peripheral speed obtained from the driving wheel speed detection means and the driven wheel peripheral speed obtained from the driven wheel speed detection means, the actuator control means reducing a transmission force of the clutch and making the clutch partially engaged when the driving wheel peripheral speed is lower than the driven wheel peripheral speed and an absolute value of a difference between the driving wheel peripheral speed and the driven wheel peripheral speed is greater than a first threshold value.

2. A clutch control system for a saddle riding vehicle, comprising:
    a clutch connecting and disconnecting a driving force from an engine relative to a driving wheel;
    an actuator causing the clutch to engage or disengage;
    a driving wheel speed detection means detecting a driving wheel peripheral speed in the driving wheel;
    a driven wheel speed detection means detecting a driven wheel peripheral speed in a driven wheel;
    an actuator control means controlling the actuator based on the driving wheel peripheral speed obtained from the driving wheel speed detection means and the driven wheel peripheral speed obtained from the driven wheel speed detection means, the actuator control means reducing a transmission force of the clutch when the driving wheel peripheral speed is lower than the driven wheel peripheral speed and an absolute value of a difference between the driving wheel peripheral speed and the driven wheel peripheral speed is greater than a first threshold value; and
    an engine control means reducing an output of the engine when the driving wheel peripheral speed is higher than the driven wheel peripheral speed and an absolute value of a difference between the driving wheel peripheral speed and the driven wheel peripheral speed is greater than a second threshold value.

3. A clutch control system for a saddle riding vehicle, comprising:
    a clutch connecting and disconnecting a driving force from an engine relative to a driving wheel;
    an actuator causing the clutch to engage or disengage;
    a driving wheel speed detection means detecting a driving wheel peripheral speed in the driving wheel;
    a driven wheel speed detection means detecting a driven wheel peripheral speed in a driven wheel;
    an actuator control means controlling the actuator based on the driving wheel peripheral speed obtained from the driving wheel speed detection means and the driven wheel peripheral speed obtained from the driven wheel speed detection means, the actuator control means reducing a transmission force of the clutch when the driving wheel peripheral speed is lower than the driven wheel peripheral speed and an absolute value of a difference between the driving wheel peripheral speed and the driven wheel peripheral speed is greater than a first threshold value;
    a clutch lever manually causing the clutch to engage and disengage; and
    a lever operation amount detection means detecting an operation amount of the clutch lever;
    wherein the actuator control means suspends or does not start processing for reducing the transmission force of the clutch when the operation amount obtained from the lever operation amount detection means is greater than a third threshold value.

4. The clutch control system according to claim 2, further comprising:
    a clutch lever manually causing the clutch to engage and disengage; and
    a lever operation amount detection means detecting an operation amount of the clutch lever;
    wherein the actuator control means suspends or does not start processing for reducing the transmission force of the clutch when the operation amount obtained from the lever operation amount detection means is greater than a third threshold value.

5. The clutch control system according to claim 1, further comprising:
    an inclination angle detection means detecting an inclination angle of the saddle riding vehicle to the left or right,
    wherein the actuator control means controls the transmission force of the clutch based on the inclination angle obtained from the inclination angle detection means.

6. The clutch control system according to claim 2, further comprising:
    an inclination angle detection means detecting an inclination angle of the saddle riding vehicle to the left or right,
    wherein the actuator control means controls the transmission force of the clutch based on the inclination angle obtained from the inclination angle detection means.

7. The clutch control system according to claim 3, further comprising:
    an inclination angle detection means detecting an inclination angle of the saddle riding vehicle to the left or right,
    wherein the actuator control means controls the transmission force of the clutch based on the inclination angle obtained from the inclination angle detection means.

8. The clutch control system according to claim 4, further comprising:
    an inclination angle detection means detecting an inclination angle of the saddle riding vehicle to the left or right,
    wherein the actuator control means controls the transmission force of the clutch based on the inclination angle obtained from the inclination angle detection means.

9. The clutch control system according to claim 2, further comprising:
    an inclination angle detection means detecting an inclination angle of the saddle riding vehicle to the left or right,
    wherein the engine control means controls the output of the engine based on the inclination angle obtained from the inclination angle detection means.

10. The clutch control system according to claim 3, further comprising:
    an inclination angle detection means detecting an inclination angle of the saddle riding vehicle to the left or right,
    wherein the engine control means controls the output of the engine based on the inclination angle obtained from the inclination angle detection means.

11. A clutch control system for a saddle riding vehicle, comprising:

a clutch for operatively connecting and disconnecting a driving force from an engine relative to a driving wheel;

an actuator for engaging or disengaging the clutch;

a driving wheel speed detector for detecting a driving wheel peripheral speed in the driving wheel;

a driven wheel speed detector for detecting a driven wheel peripheral speed in a driven wheel; and an actuator controller for controlling the actuator based on the driving wheel peripheral speed obtained from the driving wheel speed detector and the driven wheel peripheral speed obtained from the driven wheel speed detector, the actuator controller reducing a transmission force of the clutch and making the clutch partially engaged when the driving wheel peripheral speed is lower than the driven wheel peripheral speed and an absolute value of a difference between the driving wheel peripheral speed and the driven wheel peripheral speed is greater than a first threshold value.

12. A clutch control system for a saddle riding vehicle, comprising:

a clutch for operatively connecting and disconnecting a driving force from an engine relative to a driving wheel;

an actuator for engaging or disengaging the clutch;

a driving wheel speed detector for detecting a driving wheel peripheral speed in the driving wheel;

a driven wheel speed detector for detecting a driven wheel peripheral speed in a driven wheel;

an actuator controller for controlling the actuator based on the driving wheel peripheral speed obtained from the driving wheel speed detector and the driven wheel peripheral speed obtained from the driven wheel speed detector, the actuator controller reducing a transmission force of the clutch when the driving wheel peripheral speed is lower than the driven wheel peripheral speed and an absolute value of a difference between the driving wheel peripheral speed and the driven wheel peripheral speed is greater than a first threshold value; and an engine controller for reducing an output of the engine when the driving wheel peripheral speed is higher than the driven wheel peripheral speed and an absolute value of a difference between the driving wheel peripheral speed and the driven wheel peripheral speed is greater than a second threshold value.

13. A clutch control system for a saddle riding vehicle, comprising:

a clutch for operatively connecting and disconnecting a driving force from an engine relative to a driving wheel;

an actuator for engaging or disengaging the clutch;

a driving wheel speed detector for detecting a driving wheel peripheral speed in the driving wheel;

a driven wheel speed detector for detecting a driven wheel peripheral speed in a driven wheel;

an actuator controller for controlling the actuator based on the driving wheel peripheral speed obtained from the driving wheel speed detector and the driven wheel peripheral speed obtained from the driven wheel speed detector, the actuator controller reducing a transmission force of the clutch when the driving wheel peripheral speed is lower than the driven wheel peripheral speed and an absolute value of a difference between the driving wheel peripheral speed and the driven wheel peripheral speed is greater than a first threshold value;

a clutch lever manually causing the clutch to engage and disengage; and a lever operation amount detector for detecting an operation amount of the clutch lever;

wherein the actuator controller suspends or does not start processing for reducing the transmission force of the clutch when the operation amount obtained from the lever operation amount detector is greater than a third threshold value.

14. The clutch control system according to claim 12, further comprising:

a clutch lever manually causing the clutch to engage and disengage; and a lever operation amount detector for detecting an operation amount of the clutch lever;

wherein the actuator controller suspends or does not start processing for reducing the transmission force of the clutch when the operation amount obtained from the lever operation amount detector is greater than a third threshold value.

15. The clutch control system according to claim 11, further comprising:

an inclination angle detector for detecting an inclination angle of the saddle riding vehicle to the left or right, wherein the actuator controller controls the transmission force of the clutch based on the inclination angle obtained from the inclination angle detector.

16. The clutch control system according to claim 12, further comprising:

an inclination angle detector detecting an inclination angle of the saddle riding vehicle to the left or right, wherein the actuator controller controls the transmission force of the clutch based on the inclination angle obtained from the inclination angle detector.

17. The clutch control system according to claim 13, further comprising:

an inclination angle detector detecting an inclination angle of the saddle riding vehicle to the left or right, wherein the actuator controller controls the transmission force of the clutch based on the inclination angle obtained from the inclination angle detector.

18. The clutch control system according to claim 14, further comprising:

an inclination angle detector detecting an inclination angle of the saddle riding vehicle to the left or right, wherein the actuator controller controls the transmission force of the clutch based on the inclination angle obtained from the inclination angle detector.

19. The clutch control system according to claim 12, further comprising:

an inclination angle detector for detecting an inclination angle of the saddle riding vehicle to the left or right, wherein the engine controller controls the output of the engine based on the inclination angle obtained from the inclination angle detector.

20. The clutch control system according to claim 13, further comprising:

an inclination angle detector detecting an inclination angle of the saddle riding vehicle to the left or right, wherein the engine controller controls the output of the engine based on the inclination angle obtained from the inclination angle detector.

* * * * *